US010496452B2

(12) United States Patent
Gamon et al.

(10) Patent No.: US 10,496,452 B2
(45) Date of Patent: Dec. 3, 2019

(54) NATURAL LANGUAGE INTERFACE TO WEB API

(71) Applicant: Microsoft Technology Licensing, LLC, Redmond, WA (US)

(72) Inventors: Michael Gamon, Seattle, WA (US); Mark Encarnacion, Bellevue, WA (US); Patrick Pantel, Bellevue, WA (US); Ahmed Hassan Awadallah, Redmond, WA (US); Madian Khabsa, Bellevue, WA (US); Yu Su, Goleta, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 249 days.

(21) Appl. No.: 15/582,242

(22) Filed: Apr. 28, 2017

(65) Prior Publication Data

US 2018/0285170 A1    Oct. 4, 2018

Related U.S. Application Data

(60) Provisional application No. 62/479,983, filed on Mar. 31, 2017.

(51) Int. Cl.
G06F 9/54    (2006.01)
G06F 17/27    (2006.01)
G06N 7/00    (2006.01)

(52) U.S. Cl.
CPC .......... *G06F 9/541* (2013.01); *G06F 17/2785* (2013.01); *G06N 7/005* (2013.01)

(58) Field of Classification Search
CPC ...................................................... G06F 9/541
(Continued)

(56) References Cited

U.S. PATENT DOCUMENTS

| 7,596,568 B1 | 9/2009 | McConnell |
| 8,694,305 B1 | 4/2014 | Grove et al. |

(Continued)

FOREIGN PATENT DOCUMENTS

WO    2000011571 A1    3/2000

OTHER PUBLICATIONS

Freccero, et al., "Towards a natural language interface for web based application programming interfaces", In theses of KTH School of Computer Science and Communication, May 11, 2016, 37 pages.
(Continued)

*Primary Examiner* — Andy Ho
(74) *Attorney, Agent, or Firm* — Schwegman Lundberg & Woessner, P.A.

(57) ABSTRACT

Subject matter involves using natural language to Web application program interfaces (API), which map natural language commands into API calls, or API commands. This mapping enables an average user with little or no programming expertise to access Web services that use API calls using natural language. An API schema is accessed and using a specialized grammar, with the help of application programmers, canonical commands associated with the API calls are generated. A hierarchical probabilistic distribution may be applied to a semantic mesh associated with the canonical commands to identify elements of the commands that require labeling. The identified elements may be sent to annotators, for labeling with NL phrases. Labeled elements may be applied to the semantic mesh and probabilities, or weights updated. Labeled elements may be mapped to the canonical commands with machine learning to generate a natural language to API interface. Other embodiments are described and claimed.

20 Claims, 13 Drawing Sheets

(58) Field of Classification Search
USPC .......................................................... 719/328
See application file for complete search history.

(56) References Cited

U.S. PATENT DOCUMENTS

| | | | |
|---|---|---|---|
| 9,092,276 B2* | 7/2015 | Allen | G06F 9/541 |
| 9,223,901 B2* | 12/2015 | Rabben | G06F 16/9032 |
| 9,589,578 B1 | 3/2017 | Dippenaar | |
| 10,108,605 B1* | 10/2018 | Leighton | G06F 16/3334 |
| 2014/0207716 A1 | 7/2014 | Hsu et al. | |
| 2014/0244254 A1 | 8/2014 | Ju et al. | |
| 2015/0169385 A1 | 6/2015 | Allen et al. | |
| 2015/0186193 A1* | 7/2015 | Jain | G06F 9/541 |
| | | | 719/328 |
| 2015/0301795 A1 | 10/2015 | Lebrun | |
| 2019/0286451 A1 | 9/2019 | Awadallah et al. | |

OTHER PUBLICATIONS

Han, et al., "NLify: Lightweight Spoken Natural Language Interfaces via Exhaustive Paraphrasing", In Proceedings of the ACM international joint conference on Pervasive and ubiquitous computing, Sep. 8, 2013, 10 pages.

"International Search Report and Written Opinion Issued in PCT Application No. PCT/US19/020853", dated Jun. 11, 2019, 12 Pages.

* cited by examiner

201 — HOW MANY UNREAD EMAILS ABOUT PHD APPLICATIONS DO I HAVE?

203 —
```
HTTP VERB:      GET
RESOURCE:       MESSAGES
RETURN TYPE:    NUMBER
REQ'D PARAMETERS: { }
OPTIONAL PARAMETERS: {
        FILTER(ISREAD = FALSE),
        SEARCH("PHD APPLICATION"),
        COUNT( )
}
```

205 — GET HTTS://GRAPH.EMAILENGINE.COM/V1.0/<USER-ID>/MESSAGES?FILTER=ISREAD%20EQ%20FALSE&$SEARCH=PHD%20APPLICATIONS&$COUNT=TRUE

*FIG. 2*

501 — API CALL

GET-EVENTS}{ (SELECT (LOCATION, TOP(1), FILTER(START > NOW), ORDERBY(START, ASC), }

503 — CANONICAL COMMAND

GET THE LOCATION OF THE TOP 1 EVENT THAT START TIME IS AFTER NOW, AND ORDER BY START TIME IN ASCENDING ORDER

PARAPHRASING FROM CROWDSOURCING

505A — WHERE IS MY NEXT MEETING?
WHAT'S THE LOCATION OF MY NEXT EVENT? — 505B
505C — FIND NEXT MEETING'S LOCATION.
...

*FIG. 5*

| PROPERTY | VALUE TYPE | VALUE |
|---|---|---|
| FROM | RECEIPIENT | JOHN_SMITH |
| ISREAD | BOOLEAN | TRUE, FALSE |
| RECEIVEDDATETIME | DATETIME | TODAY, THIS WEEK |
| SUBJECT | STRING | NONE |
| BODY | STRING | NONE |
| ... | ... | ... |

301 FROM
302 ISREAD
303 RECEIVEDDATETIME
304 SUBJECT
305 BODY 300
323
313

*FIG. 3*

| QUERY OPTION | DESCRIPTION |
|---|---|
| SEARCH(STRING) | SEARCH FOR ENTITIES CONTAINING SPECIFIED KEYWORDS |
| FILTER(BOOLEXPR) | FILTER ENTITIES ACCORDING TO CERTAIN CRITERIA, E.G., ISREAD==FALSE |
| ORDERBY(PROPERTY, ORDER) | SORT ENTITIES ACCORDING TO PROPERTY IN 'ASC' OR 'DESC' ORDER |
| SELECT(PROPERTY) | INSTEAD OF FULL ENTITIES, ONLY RETURN A CERTAIN PROPERTY |
| COUNT() | COUNT THE NUMBER OF MATCHED ENTITIES |
| TOP(INTEGER) | ONLY RETURN THE FIRST FEW RESULTS |

400
401 SEARCH(STRING)
402 FILTER(BOOLEXPR)
403 ORDERBY(PROPERTY, ORDER)
404 SELECT(PROPERTY)
405 COUNT()
406 TOP(INTEGER)

*FIG. 4*

NATURAL LANGUAGE INTERFACE TO WEB API

CLAIM OF PRIORITY

This application claims the benefit of priority to U.S. Provisional Application Ser. No. 62/479,983, filed on Mar. 31, 2017, which application is incorporated herein by reference in its entirety.

TECHNICAL FIELD

Embodiments of the present subject matter relate generally to natural language interfaces, and, more specifically, but without limitation, to providing a natural language interface (NLI) to Web APIs.

BACKGROUND

Various mechanisms exist to provide data and services over a network such as the public Internet, also known as the Web. The Web is witnessing a revolution towards a service-oriented architecture, where distributed, autonomous, and platform-agnostic Web services are becoming the standard way for organizations to expose their data and services. This revolution has been significantly expedited in recent years by the proliferation of cloud platforms such as provided by Amazon Web Services (AWS) cloud computing and Microsoft Corp. Azure® cloud computing service for building, deploying, and managing applications and services through a global network of managed data centers. These and other services provide large-scale storage and computing infrastructure to support low-cost construction and maintenance of Web services.

Web services are often exposed via Web application program interfaces (APIs), which are called programmatically. Most users, however, do not have the programming skills to make API calls. Instead, they rely on various desktop or Web applications to access Web services. For example, a sports application may gather match results from Web service providers such as ESPN and present them to users. However, this brings the burden on users to switch between and adapt to different applications, and constrains users to the fixed or slow-adapting functionality of each application.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which:

FIG. 2 illustrates a natural language (NL) command, an associated API frame, and resulting API call, according to an embodiment;

FIG. 3 illustrates a table of properties for the message (e-mail) in the example email program, according to an embodiment;

FIG. 4 illustrates a table of query options available for the example messaging system, according to an embodiment;

FIG. 5 illustrates a crowd-sourcing pipeline for annotation of API calls with NL commands for training, according to an embodiment;

SUMMARY

Figure 1:
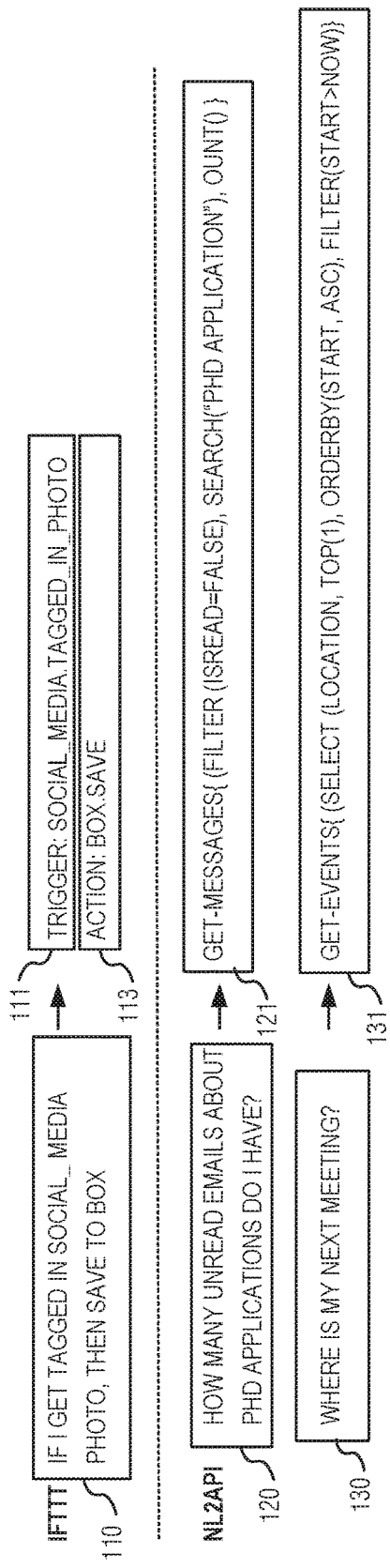
FIG. 1 illustrates a comparison of the if this than that (IFTTT) methodology with a methodology described herein, according to an embodiment.

Embodiments described herein use natural language (NL) to Web application program interfaces (API) (e.g., for shorthand, referred to as NL2API), which map natural language queries and commands into API calls, or API commands. This mapping enables an average user with little or no programming expertise to access Web services that use API calls using natural language. In addition, NL2API has great potential for Web service discovery, recommendation, and composition, and thus can also help developers in application development.

Each Web API has a schema associated with it that defines the syntax and context of each API call/command applicable to the API. This schema is typically programmatically discoverable from the API. An embodiment described herein accesses an API schema for an API, and utilizes a specialized grammar, with the help of application programmers, to generate canonical commands, as described more fully below, associated with the API calls. A probabilistic distribution may be applied to a semantic mesh associated with the canonical commands to identify elements of the API commands that require labeling. The identified elements may be sent to crowd source workers, or annotators, to label the canonical commands with NL phrases. Labeled elements may be applied to the semantic mesh and probabilities, or weights updated. Labeled elements may be mapped to the canonical commands with machine learning to generate a natural language to API (NL2API) interface. The NL2API interface may be provided with a Web application so that end-users may easily interface with API-based applications using natural language.

Other embodiments may include a method, means for performing acts of the method, at least one machine-readable medium including instructions that, when performed by a machine cause the machine to perform acts of the method, or of an apparatus or system for natural language interface to Web API.

DETAILED DESCRIPTION

In the following description, for purposes of explanation, various details are set forth in order to provide a thorough understanding of some example embodiments. It will be apparent, however, to one skilled in the art that the present subject matter may be practiced without these specific details, or with slight alterations.

Reference in the specification to "one embodiment" or "an embodiment" means that a particular feature, structure or characteristic described in connection with the embodiment is included in at least one embodiment of the present subject matter. Thus, the appearances of the phrase "in one embodiment" or "in an embodiment" appearing in various places throughout the specification are not necessarily all referring to the same embodiment, or to different or mutually exclusive embodiments. Features of various embodiments may be combined in other embodiments.

For purposes of explanation, specific configurations and details are set forth in order to provide a thorough understanding of the present subject matter. However, it will be apparent to one of ordinary skill in the art that embodiments of the subject matter described may be practiced without the specific details presented herein, or in various combinations, as described herein. Furthermore, well-known features may be omitted or simplified in order not to obscure the described embodiments. Various examples may be given throughout this description. These are merely descriptions of specific embodiments. The scope or meaning of the claims is not limited to the examples given.

Web services exposed via Web application program interfaces (APIs) are becoming the de facto way to provide data and services on the Web. Due to their complex nature, traditionally only trained developers can easily use these APIs, making it hard to scale. In other words, it may be hard for developers to write more and more applications that interoperate with the API, and hard for users to directly interface with the APIs. Embodiments described herein use a natural language to Web APIs (NL2API) interface, which eases the scaling problem by allowing any software end-user, not just trained programmers, to directly interact with Web services. Discussed herein is a framework to bootstrap an NL2API when there is no training data, also referred to as "learning from zero." Training data may be generated in iterations, starting from zero, using sets of annotated commands and phrases.

In an embodiment, training data may be collected for the NL2APIs via crowd-sourcing, which may provide Natural Language (NL) command and API call pairs. API calls may be generated by enumerating parameter combinations of an API, using only the specification, or schema, of the API. Since typical users may not fully comprehend APIs, the API may be pre-processed with each API call converted into a canonical NL command using a grammar. Thus, crowd-sourced workers, or crowd workers as shorthand, only need to paraphrase the commands in a more natural way, making the task much easier. Utilizing crowd workers, often contracted as a temporary employee or contract employee from a third party, may be a good way to maintain accuracy in the NL API call pairs, however, this mapping may prove to be very expensive when the grammar, syntax or robustness of the API is very large. In an embodiment, a hierarchical probabilistic model may be used for the crowd-sourcing process, to reduce costs. Use of the hierarchical probabilistic model allows allocation of budget to those API calls that have a high value for training NL2API. The framework may be applied to a number of real-world APIs, and empirical data show that it can collect high-quality training data at a low cost. Thus, a simple NL2API algorithm trained on the data may achieve a reasonably good performance at a fraction of the cost of traditional methods. Training data collected using the framework described herein may be better than that of a baseline, which may lead to a better performance of the NL2API.

An API may be defined by schema which may be programmatically derived from the API. An embodiment of the present subject matter is a system and method relating to generating a generic defined grammar having elements including lexicons, Boolean, query and glue operators, for use with API calls, and then specializing the grammar for a specific API, based on the API schema. A glue operator is an operator that holds different parts of the sentence together, linguistically. A software developer, programmer or other expert, may generate a set of canonical commands for an API call, or components of an API call, for further labeling. Labeling of the canonical commands with NL phrases allows a machine learned mapping of NL-to-canonical phrase-to-API call. An element e of the canonical phrase, that is used with one type of API call may be used with other API calls. Thus, if e has been labeled for one API call, avoiding labeling e again may result in a more cost effective labeling process. Labeling may typically be performed by non-expert crowd workers for a fee. Thus, minimizing the number of elements that require labeling may result in significant cost savings and lower the complexity of the NL2API interface. In an embodiment, a probabilistic, rather than deterministic, model may be used to weight, or score, the probability that the phrase or partial API call requires labeling. A differential propagation of the weights may be applied to a semantic mesh of nodes, where a node is a partial API call. The differential propagation may be used to provide an ordered list of elements or portions of an API call, to crowd workers for labeling.

While there have been studies on natural language interfaces (NLI) to other formal representations, such as for relational databases, knowledge bases, and Web tables, little previous research has been conducted on NLI to Web APIs. An existing methodology maps which NL commands in an IF-This-Then-That (IFTTT) form into API calls. FIG. 1 illustrates a comparison of the IFTTT methodology with a methodology described herein, according to an embodiment. IFTTT approach relates to API calls with default or simple parameterization. For instance, in an example a user desires to save photos in which the user has been tagged, into a storage such as Box, Dropbox, Google Drive, etc. The trigger 111 is when a social media site tags the user in the photo. The action 113 is to save the photo in a desired location. The NL to effect this trigger/action is the IFTTT phrase 110 "If I get tagged in social media photo, then save to Box." However, users often have specific needs that require more advanced parameterization. For example, when searching emails, a user may want to filter by a flag, search for keywords, or even do some counting. In an example, a user may ask in an NL phrase 120, "how many unread emails about PhD applications do I have?" In this example, an API call 121 may be generated as GET-Messages{(FILTER (IsRead=False), SEARCH("PhD application"), COUNT( )}. The API syntax uses the GET_Messages call and includes a FILTER indicating whether the email has been read (e.g., IsRead=False), a search string "PhD application," and a COUNT function to return the value as requested by the "how many" phrase. In another example, a user may ask in an NL phrase 130, "where is my next meeting?" In this example, an API call 131 may be generated as GET-Events{(SELECT (location, TOP(1), ORDERBY (start, asc), FILTER(start>now)}. Here the API call is GET_Events (e.g., meetings) and the syntax includes a FILTER start time to only return future meetings, SELECT parameter to identify the location, and an ORDERBY function to order the meetings temporally in order to find the next event.

One empirical study analyzing API calls to an email search engine in one month found that roughly 90% of the calls involved only two or three parameters, nearly evenly split, and the parameterizations are diversified. Therefore, a mapping of NL to API calls for this particular email search engine may be fairly supported using the two or three parameters. More complex APIs may require additional mapping.

In an embodiment, a straightforward way to build an NLI is to handcraft a set of rules for the semantic mapping from NL to formal meaning representations, but this methodology can be brittle and can easily become cumbersome. One approach is to learn the mapping using some supervised machine learning algorithm, which may be less error-prone and more generalizable. The first step to build an NLI is typically to collect labeled training data for the learning algorithm. The task of collecting labeled training data for myriad APIs is of particular interest for NL2API embodiments described herein. Since there are so many different APIs, a systematic and scalable way for data collection is highly desired. An embodiment provides an automated, or partially automated mechanism to optimize the training data collection process.

Existing work of NLIs usually collect training data in a best-effort manner. For example, the training data related to the IFTTT in FIG. 1 may be retrieved from the IFTTT® Website, where users first select a trigger API call and an action API call with the aid of a GUI, and then give an NL description. There is typically no independent control over what APIs and parameterizations are included in the GUIs provided to a user. For this type of interface, the user relies on the GUI. If an API gets insufficient coverage, there is typically no way for a user to fix it.

An embodiment may enable a learning-from-zero framework to tackle the problem of bootstrapping an NL2API. In an example, humans may be employed to annotate API calls with NL commands for training. This method accomplishes at least two design goals. First, it may be configurable; parameterization, and how much training data to be collected may be specified for selected APIs. Second, the method may be low cost. In an example, crowd workers may be employed rather than experts. The ability to utilize crowd workers may significantly lower the cost of labeling/annotating the data for training.

In an embodiment, an intermediate semantic representation for APIs may be designed. This intermediate representation allows the model to remain agnostic of irrelevant details such as URL conventions or HTTP headers, etc. The API calls may be easily generated with desired parameterizations. However, crowd workers without programming expertise typically cannot directly annotate API calls. In an example, each API call is converted into a canonical NL command. The canonical NL command may be simple, but understandable by an average crowd worker. In this way, crowd workers only need to paraphrase the canonical command in a more natural way, which is a much easier task.

Due to combinatorial explosion, the number of the generated API calls may be large. It is not economic, nor necessary, to annotate every possible API call. In an embodiment, a hierarchical probabilistic model for the crowd-sourcing process may be used to eliminate unnecessary and costly annotation. Similar to language modeling for information retrieval, it may be assumed that NL commands are generated from the corresponding API calls. In an embodiment, a language model may be estimated for each API call to capture this generative process. One aspect of this model is the compositional nature of API calls, or that of formal meaning representations in general. If an API call is composed of some simpler API calls (e.g., "unread emails about PhD application"="unread emails"+"emails about PhD application"), then the language model may be inferred from those of the simpler API calls, without even annotating them. Therefore, by just annotating a small number of API calls, the language model may be estimated for all of them. The estimated language models may not be perfect. However, despite the imperfect estimation, an embodiment may foresee the language model of unannotated API calls, and succeed, or come close to optimizing the crowd-sourcing process.

FIG. 2 illustrates a natural language command 201, an associated API frame 203 and resulting API call 205, according to an embodiment. As described herein, an API frame is a semantic structure representing the components needed to construct a REST API call, but abstracting out the syntax of REST (e.g., headers, HTML escaping rules, headers, etc.). There may be a deterministic mapping from an instantiated frame (e.g., where the parameters are instantiated, such as FALSE for isRead, and "PhD Application" for Search) to a REST API call. In an embodiment, a framework to collect training data for NL2API via crowd-sourcing may be used. API calls may be generated and converted into a canonical command using a simple grammar, and employ crowd workers to paraphrase the canonical commands. Based on the compositional nature of API calls, a hierarchical probabilistic model for the crowd-sourcing process may be used. A method may be used to optimize the crowd-sourcing process, as discussed more fully, below.

In an example, a NL phrase 201 may be framed to an API 203. The mapped API call 205 may be used to effect the NL in the Web application. For instance, the NL phrase 201 asks "how many unread emails about PhD applications do I have?" A developer well-versed in the API may create the frame 203 which may include a verb, resource, return type required parameters and optional parameters. The framed information may be converted to the actual API call 205 which uses the GET call.

In an embodiment, the Representational State Transfer (REST) API architecture may be used. In recent years, Web APIs following the REST architectural style, also known as RESTful APIs, have been becoming more popular because of their simplicity. REST is a set of principles including stateless communication and a uniform interface. Restful APIs revolve around resources, are addressable via URIs, and provide access to resources to a broad range of front-end consumers via simple HTTP verbs such as GET, PUT, POST, etc. For illustrative purposes, embodiments described herein use the REST architecture. It will be understood that the methods, algorithms and systems as described may be generalized and applied to other APIs with slight adaptation.

A task of an NLI is to map an utterance (natural language command) into a certain formal meaning representation, for instance as SQL queries for relational databases, logical forms or SPARQL queries for knowledge bases, or Web APIs for embodiments described herein. Focusing on the semantic mapping enables one to stay agnostic from irrelevant details. An intermediate semantic representation may be employed, instead of working directly with the final data representation. For example, combinatory categorial grammar has been widely used for NLI to relational databases and knowledge bases. This kind of abstraction may also be used for embodiments described herein. There are many details, such as URL conventions. HTTP headers, and response codes, that may cause deviation from the core semantic mapping task. Therefore, embodiments herein define an intermediate representation for RESTful APIs as seen in FIG. 2, for a named API frame 203 and reminiscent of frame semantics. An API frame 203 may consist of five parts 203. HTTP verb and Resource are basic in RESTful APIs. Return Type may be useful for API composition, to compose multiple API calls to fulfill a more complex task. Required Parameters are mostly used in PUT or POST API calls, e.g., sending an email requires the recipient, title and body. Optional Parameters are often involved in GET API calls to specify detailed information needed. When there are no required parameters, the API frame may be serialized, GET-messages {FILTER(IsRead=False), SEARCH('PhD application'), COUNT}. In use, an API frame 203 may be converted into the API call 205, deterministically. Therefore, the API frame and API call may be used interchangeably hereafter. The terms utterance and command may also be used interchangeably.

In examples, the Microsoft® Graph API is used as an illustrative example to describe embodiments, herein. The Microsoft® Graph API includes an array of RESTful APIs providing access to various Microsoft® data and services like Microsoft® Office® and Microsoft® OneDrive®. This set of RESTful APIs follows the Open Data Protocol (OData). In OData, resources are entities, each associated with a list of properties. For instance, a schema associated with an API may consist of properties (e.g., attributes or relationships), an expected type (e.g., string, datetime, Boolean, or other type defined in the schema), and meta-properties (e.g., cardinality, required, etc.).

FIG. 3 illustrates a table 300 of properties for the message (e-mail) in the example email program, Microsoft®) Graph, according to an embodiment. Properties may include, but are not limited to, From 301, IsRead 302, Receivedatetime 303, Subject 304, and Body 305. For instance, IsRead 302 is a Boolean property and may be either True or False, indicating whether or not the message has been read. Subject 304 is a string property and does not have preset values, and is associated with the subject line of the message.

In addition, OData defines a set of query options to enable advanced resource manipulation. FIG. 4 illustrates a table 400 of query options available for the example messaging system, according to an embodiment. For example, one may search for emails from a specific person or received on a certain date using the FILTER option 402. In an embodiment, query options Search 401, Filter 402, Orderby 403, Select 404. Count 405, and Top 406 may be used for API call mapping. Some other query options, such as SKIP for result paging, may be less relevant to NLI and may not be included. Each specific API may have its own set of query options, with some being more relevant than others. Each combination of an HTTP verb and an entity or entity set may be referred to as an API. For example, GET-Messages API call may be used to retrieve a message or a collection of messages. Each parameterized query option, such as (FILTER(IsRead=False)), is a parameter, and an API call is an API with an array of parameters.

FIG. 5 illustrates a crowd-sourcing pipeline for annotation of API calls with NL commands for training, according to an embodiment. An API call 501 may be converted to canonical command 503, in terms an average non-programmer (e.g., crowd worker) may understand. The crowd workers may generate multiple NL phrases 505A-C that should essentially execute the canonical command 503 and convert to the API call 501.

API calls may be generated solely from the specification of an API. In addition to the schema items like query options and entity properties (see FIGS. 3-4), property values may be necessary to generate the API calls, which are not available in the API specification. For example, properties of enumerable value type, e.g., Boolean, all of the possible values (True/False) may be enumerated. For properties with unconstrained value type, e.g., Datetime 313, a few representative values for each property, e.g., today or this-week 323 may be synthesized for receivedDateTime 303. It should be noted that these are abstract values at the API frame level, and may be converted into real values according to the context, (e.g., the real-world date/time), when an API frame is converted into an API call.

Combinations of query options, properties, and property values may be enumerated to generate API calls. Heuristics may be used to reduce combinations that are not very sensible. For instance, when building an NL2API for the Microsoft® Message API, examination of the logs for how applications use the API, identify many patterns that may be seldom or never used, and others that may be very common. In an embodiment, the commonly used patterns may be sent for annotation first, as a focus. In an example, TOP 406 may be applied on a sorted list, so it should be used together with ORDERBY 403. Also, Boolean properties such IsRead 302 cannot be used in ORDERBY 403 because the property and query option are mutually exclusive.

Figure 6:
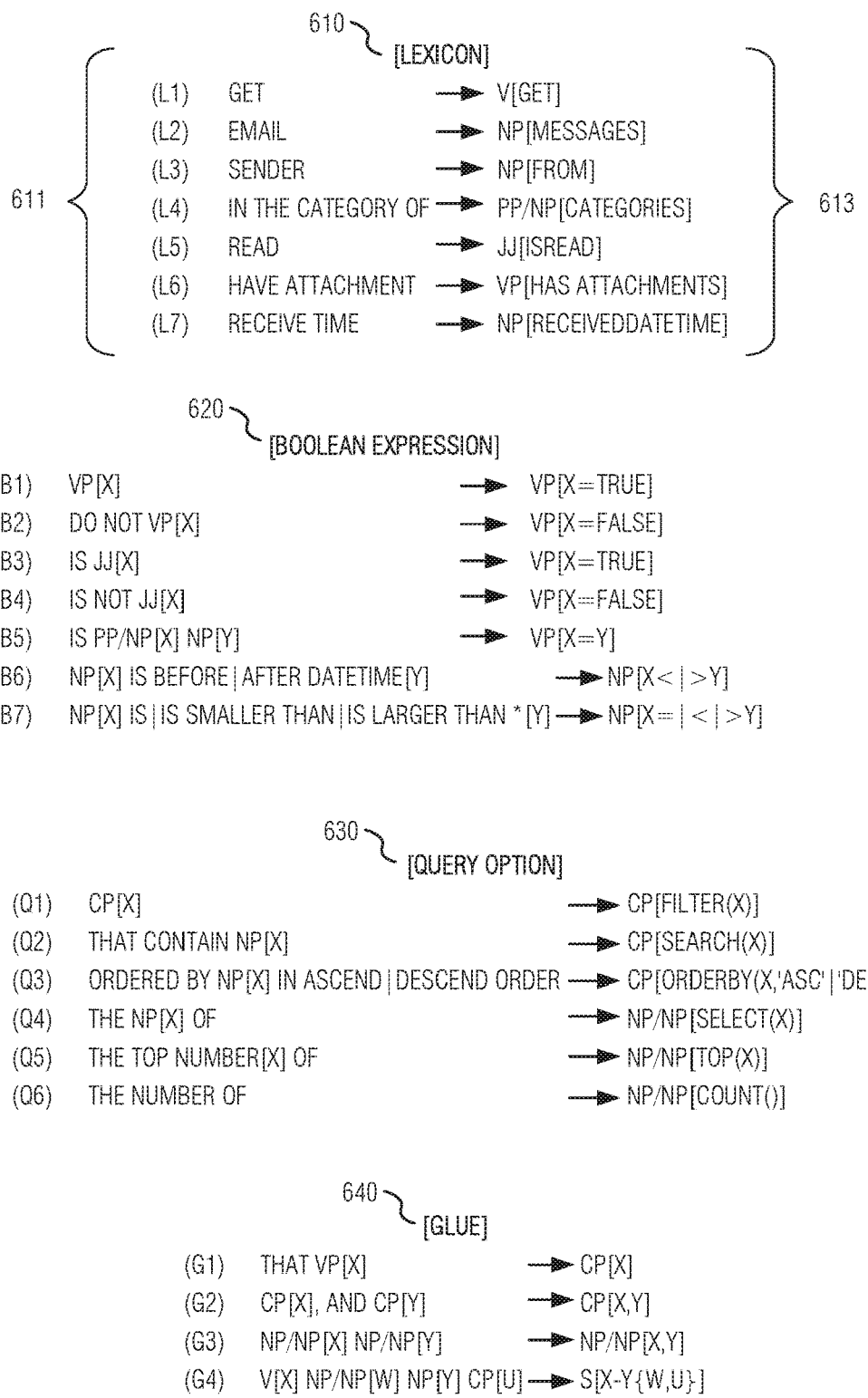
FIG. 6 illustrates an API-specific lexicon and API-general grammar, according to an embodiment.
Figure 7:
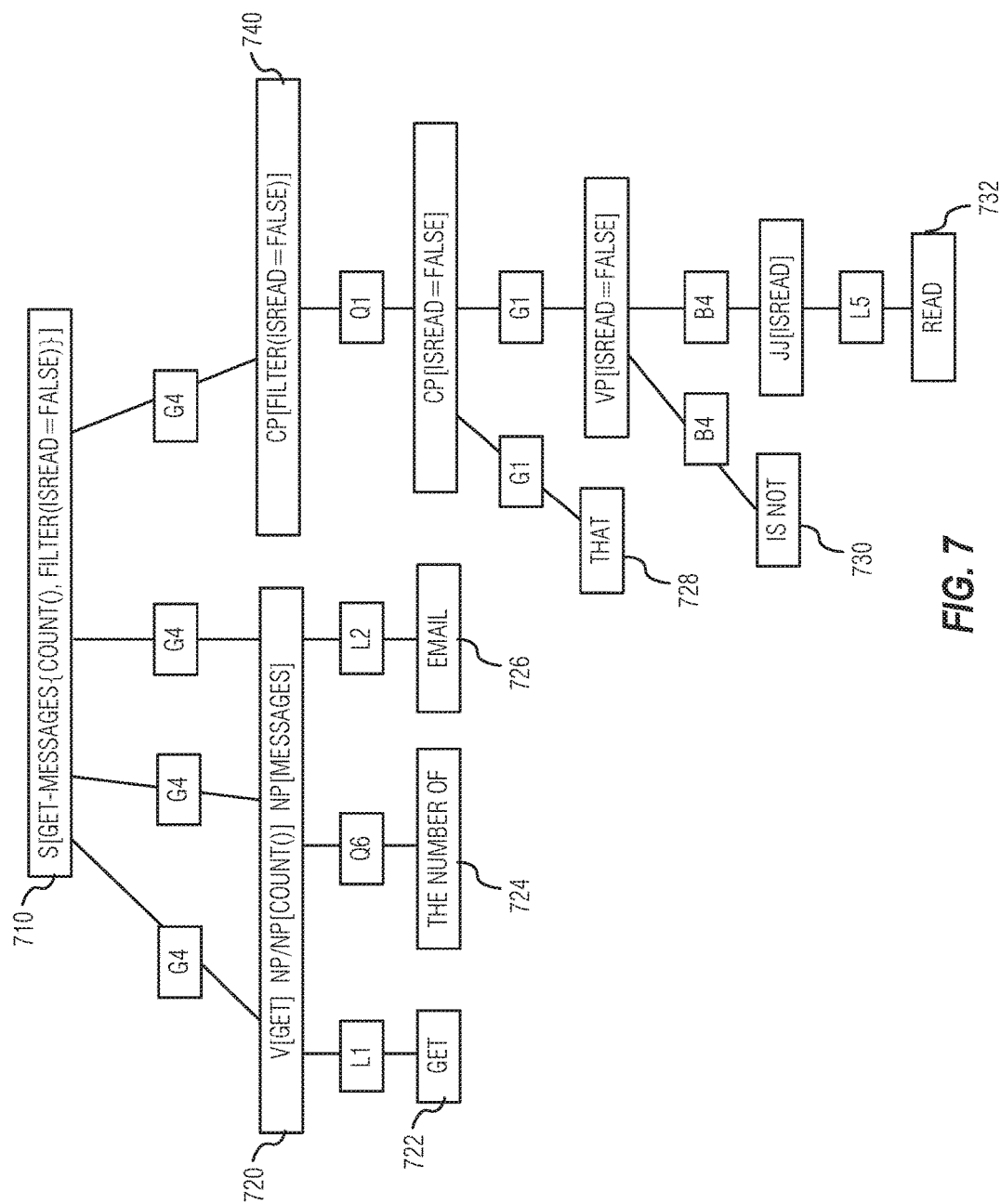
FIG. 7 illustrates a flow deriving a canonical command from an API call following the grammar in FIG. 6, according to an embodiment.

In an embodiment, the API call 501 may be converted into canonical command 503. FIGS. 6-7 illustrate the canonical command generation, according to an embodiment, where FIG. 6 illustrates the API-specific lexicon and API-general grammar, and FIG. 7 illustrates a flow deriving a canonical command from an API call following the grammar. The grammar illustrated in FIG. 6 may include Lexicon 610, Boolean expressions 620, Query option 630 and glue, or linguistic connector, 640. In an embodiment, the Boolean expressions 620, Query options 630 and glue 640, may be derived programmatically from the API schema. However, deriving the lexicons 610 may require additional analysis and definition by a programmer (API expert) for definition, based on the context of the application. For instance, lexicon L2 may be chosen as "e-mail" to align with NL better than "message" would, for the average crowd worker or end-user. The lexicon 610 supplies a lexical form 611, along with a syntactic category 613, for each item (HTTP verbs, entities, properties, and property values). For example, the lexicon entry L3, (sender→NP [from]), specifies that the lexical form of the property from is "sender", and the syntactic category is noun phrase (NP), which will be used in the grammar. The syntactic category may also be verb (V), adjective (JJ), complementizer phrase (CP), generalized noun phrase which is followed by another noun phrase (NP/NP), generalized prepositional phrase (PP/NP), sentence (S), etc.

In an embodiment, the grammar described herein specifies how to step by step derive a canonical command from an API call. The grammar is a set of rules in the form $<t_1,$ $t_2, \ldots, t_n > \to c[z] >$, where $\{t_i\}$ is a sequence of tokens, z is a (partial) API call, and c is its syntactic category. It should be noted that syntactic categories may enable conditional derivation. For example, if Boolean expression 620, B2 is seen, e.g., VP [x=False], both rules B2 and rule B4 may be applied. The syntactic category of x may eliminate the ambiguity. For example, if the syntactic category of x is VP, rule B2 may triggered (e.g., x=hasAttachments→"do not have attachment"); if category is JJ, rule B4 may be triggered (e.g., x=IsRead→"is not read"). Thus, interpreting the syntactical category may avoid awkward canonical commands (e.g., "do not read" or "is not have attachment"), and makes the generated canonical commands more natural.

The API grammar may also include query options 630, and glue 640. As may be seen in FIG. 7, the glue 640 holds different parts of the sentence together, linguistically. Referring to FIG. 7, an example of parsing the sentence 710 S [GET-Messages {COUNT ( ), FILTER (IsRead=False)} 710 using the grammar om FIG. 6 is shown. In this example, the topmost row 710 is the API call, and the bottommost nodes 722, 724, 726, 728, 730, 732 represent the NL phrase (e.g., "get the number of email that is not read"). Formal meaning representations in general, and API calls in particular, may be compositional by nature. For example, GET-Messages {FILTER (IsRead=False), COUNT ( )} is composed of API queries GET-Messages {FILTER (IsRead=False)} and GET-Messages {COUNT ( )}. This compositionality may be exploited to model the crowdsourcing process.

According to the grammar shown in FIG. 6, API call 710 may be compositionally broken into two phrases, V[GET] NP/NP[COUNT ( )] NP[Messages] 720 and CP[FILTER (IsRead=False)] 740. In this example, phrase 720 includes lexicon L1 V[GET] (e.g., the verb GET), Query Q6 NP/NP [COUNT ( )] (e.g., the number of) and lexicon L2 NP [MESSAGES] (e.g., email). Thus, the phrase get 722 the number of 724 email 726 may be derived from the formal grammar. It follows that parsing both phrases in the composition 720, 740 may result in the NL phrase "get the number of email that is not read" 722, 724, 726, 728, 730, 732.

Parameter-level composition may be selected as the focus for defining composition. A composition may be defined based on the parameter set of API calls (e.g., FIG. 2). In an embodiment, the composition may be formally defined as follows.

DEFN (1). Given an API and a set of API calls $z_1, z_2, \ldots, z_{n+1}$, n>1, r(z) denotes the parameter set of z, where $\{z_1, z_2, \ldots, z_n\}$ is a composition of $z_{n+1}$, if and only if $\{r(z_1), r(z_2), \ldots, r(z_n)\}$ is a partition of $r(z_{n+1})$.

Based on the compositional relationship of API calls, all of the API calls of an API may be organized into a hierarchical structure. API calls with the same number of parameters may be represented as nodes residing in the same layer, and compositions may be represented as directed edges between layers.

Figure 8:
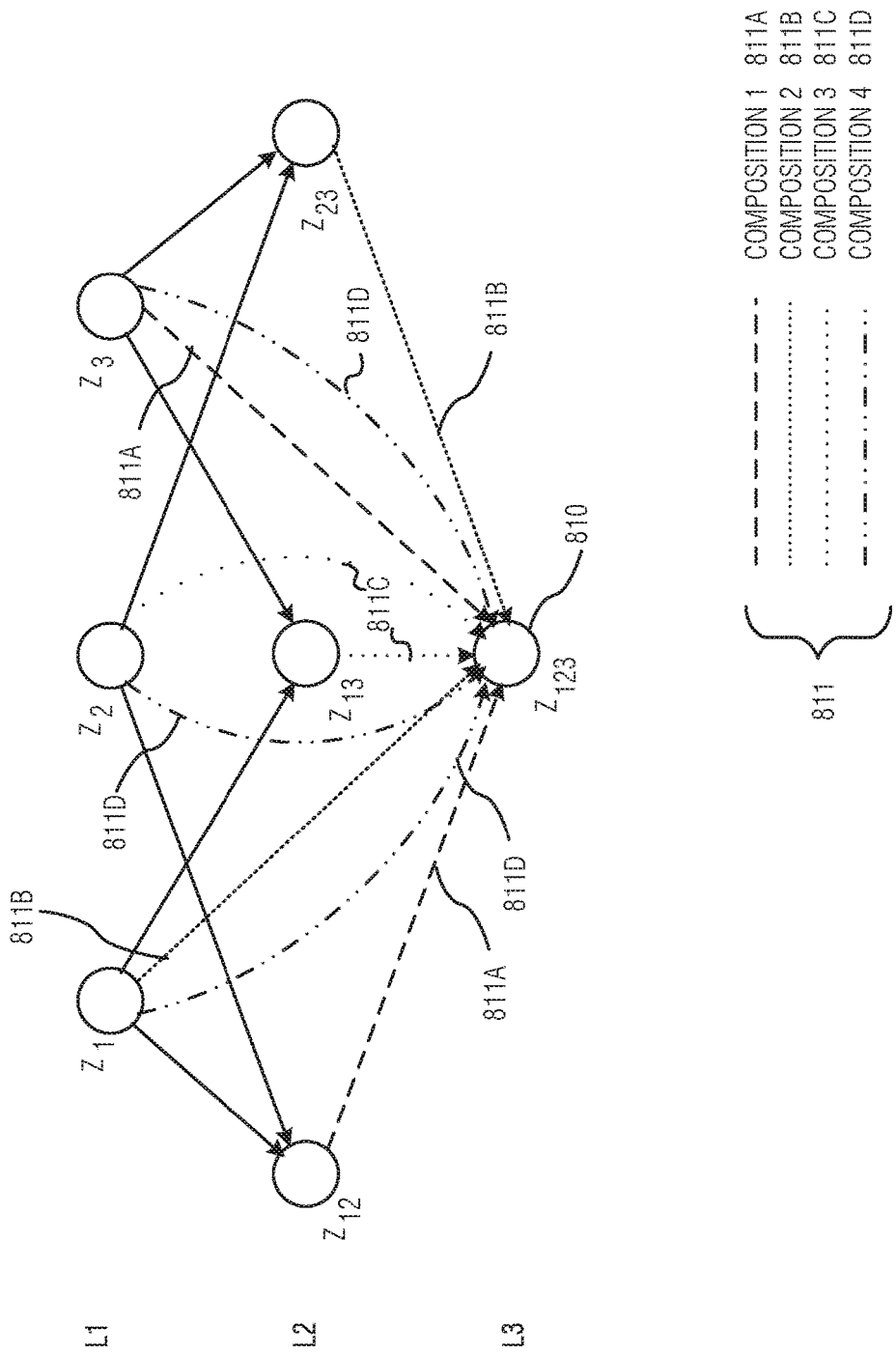
FIG. 8 illustrates a semantic mesh structure showing the i-th layer consisting of API calls with i parameters, according to an embodiment.

FIG. 8 illustrates a semantic mesh structure showing the i-th layer $L_i$ (e.g., L1, L2, L3) consisting of API calls with i parameters, according to an embodiment. In the illustration, edges between nodes represent compositions. One composition may involve multiple edges, and a node may have multiple compositions. In this illustration, $z_i$ (e.g., $z_1, z_2$, and $z_3$) represent the utterances or phrases at the first level L1. The nodes labeled $z_{ij}$ (e.g., $z_{12}, z_{13}$, and $z_{23}$) are the second level decomposition L2, and $z_{ijk}$ (e.g., $z_{123}$, is the third level decomposition L3. For example, node $z_{123}$ 810 has four compositions 811, marked using different lines 811A-D.

Probabilistic distributions on nodes characterize the corresponding language models. In an example, certain terminology is used.
  $u^z$: A set of crowdsourced utterances for z.
  $\theta^z$: A distribution describing the generative process from z to utterances.
  $\theta_{em}^z$: Empirical distribution estimated from $u^z$.
  $\theta_{ex}^z$: Expected distribution estimated from compositions.

In an embodiment, it may be assumed that utterances corresponding to the same API call z may be generated in a stochastic process, characterized by a language model $\theta^z$. For simplicity, an embodiment focuses on word probabilities; thus $\theta^z$: p(w|z). Instead of using the unigram language model, a Bag of Bernoulli (BoB) distribution may be used. Each Bernoulli distribution corresponds to a random variable W of whether word w appears in an utterance generated from z, and the BoB distribution is {p(W|z)}. The term $p_b(w|z)$ may be used as a shorthand for $p(W_i|z)$. So strictly speaking, the BoB distribution is not a language model per se, but may be referred to as a language model, for ease of presentation.

In an example, a multi-set of utterances $u^z$ may be collected for z, and $\mathcal{V}$ is the vocabulary. The maximum likelihood estimation of the BoB distribution is the faction of utterance containing w is described by Eq. (1).

$$p_b(w|z) = \frac{|\{u \mid w \in u, u \in u^z\}|}{|u^z|}, \forall w \in \mathcal{V}. \qquad \text{Eq. (1)}$$

In an example, there are three basic node-level operations in the semantic mesh: ANNOTATE, COMPOSE, and INTERPOLATE. In an example, the ANNOTATE operation is to collect utterances $u^z$ that paraphrase the canonical command of a node z via crowd-sourcing, and estimate an empirical distribution $\theta_{em}^z$ using maximum likelihood estimation. $|u^z|$ is the same for all annotated nodes. The COMPOSE operation attempts to infer $\theta^z$ based on the compositions of the node, leading to the expected distribution $\theta_{ex}^z$. In an example, $\{z_1, z_2, \ldots, z_n\}$ is a composition of z, if it is assumed that their corresponding utterances follow this compositional relationship, then $\theta_{ex}^z$ should factorize over $\{\theta^{z_1}, \theta^{z_2}, \ldots, \theta^{z_n}\}$ as described by Eq. (2).

$$\theta_{ex}^z = f(\theta^{z_1}, \theta^{z_2}, \ldots, \theta^{z_n}), \qquad \text{Eq. (2)}$$

where f is a composition function. For the BoB distribution, the composition function may be described as Eq. (3).

$$p_b(w|z) = 1 - \Pi_{i=1}^n (1 - p_b(w|z_i)). \qquad \text{Eq. (3)}$$

In other words, in an example, $u_i$ is an utterance of $z_i$, u an utterance of z, if $\{u_i\}$ compositionally form u, then word w is not in u, if and only if, it is not in any $u_i$. When z has multiple compositions, $\theta_{ex}^z$ may be computed separately and then averaged.

Of course, utterances are not always combined compositionally. For example, multiple items in a formal meaning representation may be compressed into a single word or phrase in natural language, a phenomenon coined as sub-lexical compositionality. One such example is shown in FIG. 3, where three parameters, TOP (1), FILTER (start>now), and ORDERBY (start, asc), are compressed into a single word "next." However, this information may not be known beforehand, so an assumption may be made that utterances follow the composition relationship of API calls to make it possible to compute the expected distribution.

It may be difficult to derive a composition function like Eq. (3) for the unigram language model. The normalization of word probabilities involves the length of utterances, which in turn involves the complexity of API calls, breaking the factorization in Eq. (2).

The INTERPOLATE operation, e.g., Z.INTERPOLATE( ) function, may combine all of the available information about z, e.g., the annotated utterances of z and the information inherited from compositions, and get a more accurate estimation of $\theta^z$ by interpolating $\theta_{em}^z$ and $\theta_{ex}^z$, as in Eq. (4).

$$\theta^z = \alpha * \theta_{em}^z + (1-\alpha) * \theta_{ex}^z. \qquad \text{Eq. (4)}$$

In an example, the balance parameter a controls the trade-off between the annotations of the current node, which may be accurate but scarce, and the information inherited from compositions based on the compositionality assumption, which may not be as accurate but may be rich. In some sense, $\theta_{ex}^z$ serves a similar purpose as smoothing in language modeling, which may be to better estimate the probability distribution when there is insufficient data (annotations). A larger a means more weight on $\theta_{em}^z$. For a root node that has no composition, $\theta^z = \theta_{em}^z$. For an unannotated node, $\theta^z = \theta_{ex}^z$.

Figure 9:
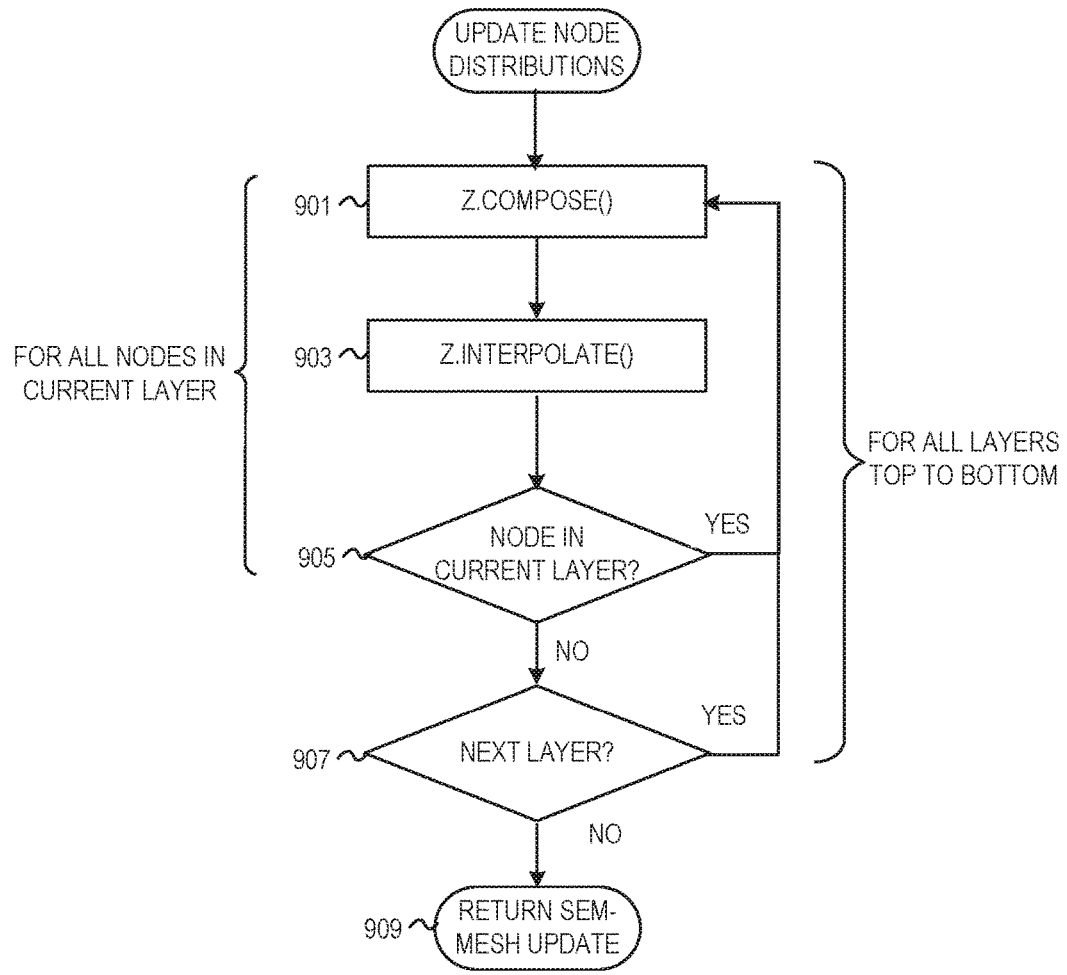
FIG. 9 is a flow diagram illustrating a method to update node distributions in a semantic mesh, according to an embodiment.

FIG. 9 is a flow diagram illustrating a method to update node distributions in a semantic mesh, (e.g., compute $\theta^z$ for all z.), according to an embodiment. In an example, $\theta_{em}^z$ is assumed to be up to date for all annotated nodes. In a top-down layer-wise manner, $\theta_{ex}^z$ and $\theta^z$ may be consecutively computed for each node z. In an embodiment, for all nodes in a current layer, the utterance z may be composed at block 901. In an example, a function Z.COMPOSE( ) may be used to perform compositioning (decomposition) over the mesh to decompose the canonical phrases into their components or compositions, such as in Eq. (3), above. Interpolation may be performed at block 903. In an example, a function Z.INTERPOLATE( ) may be used to interpolate utterance distribution as shown above in Eq. (4). Z.INTERPOLATE( ) may estimate the probability by combining the previous function, e.g., Eq. (3), and the probability obtained with manual (human) annotation of z, where both components are weighed by a and summed, where $\alpha$ is between [0,1]. If there are more nodes in the current layer, as determined in block 905, then the next node in the current layer is composed at block 901 and interpolated at block 903. When processing on the layer is complete, as determined in block 905, then if there is a next layer, as determined in block 907, the same processing continues at block 901 for the next layer.

In an embodiment, upper layers may be updated first so that the expected distribution of lower-layer nodes can be computed. As long as all of the root nodes have been annotated, $\theta^z$ may be computed for all nodes in the semantic mesh. Once the node distributions have been updated, the updated semantic mesh is returned at block 909.

Figure 10:
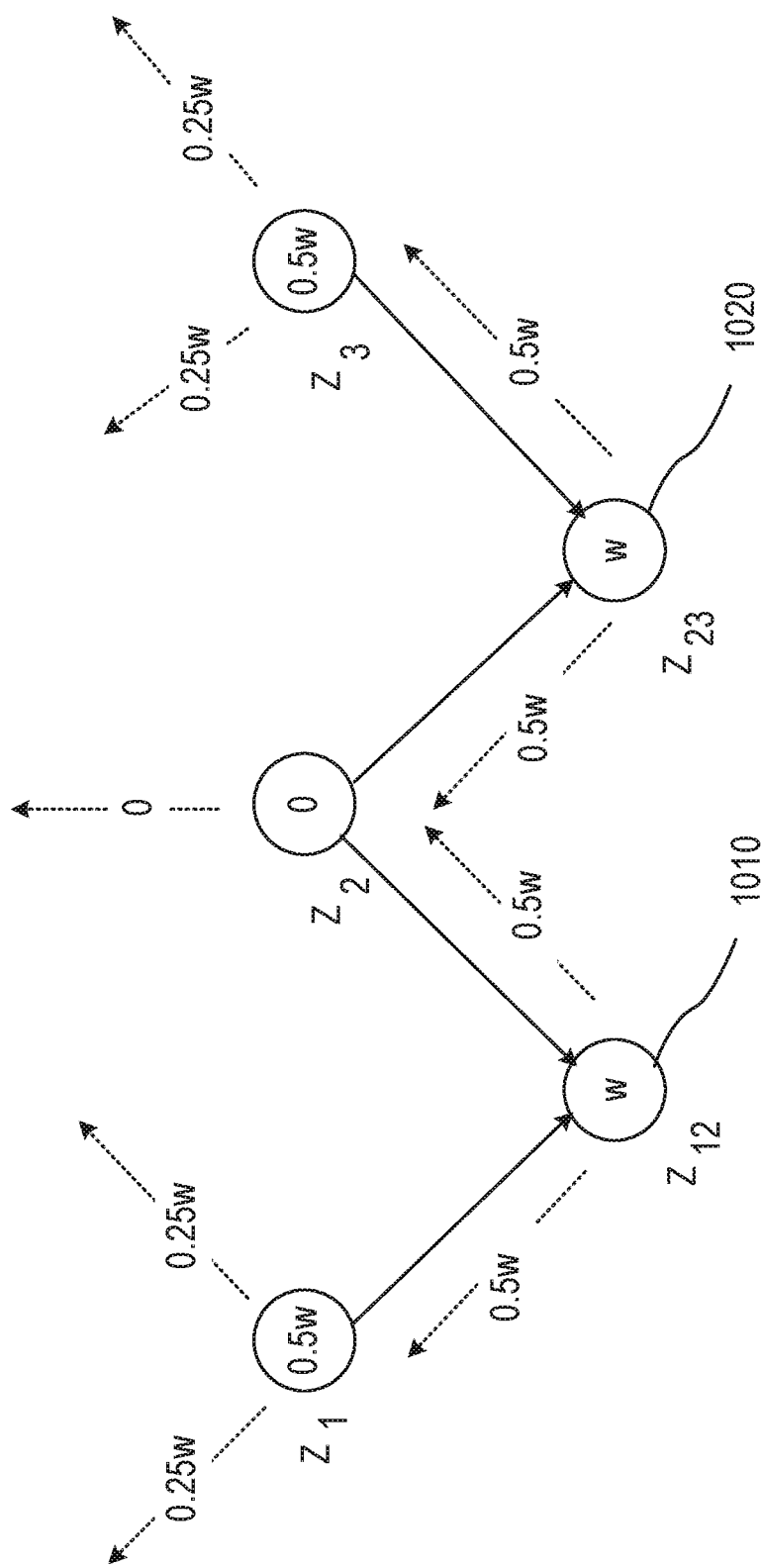
FIG. 10 illustrates an example of differential propagation in the semantic mesh, according to an embodiment.

FIG. 10 illustrates an example of differential propagation in the semantic mesh, according to an embodiment. In an embodiment, selecting which canonical commands should be sent to crowd workers to minimize cost and optimize the annotation process may use a probabilistic model. In an example, $z_{12}$ 1010 and $z_{23}$ 1020 are the node pair in the semantic mesh under examination, w is a score, or weight, computed based on $d(z_{12}, z_{23})$, and may be propagated iteratively from the bottom up, halved in each iteration. The score of a node is the absolute difference of its scores from $z_{12}$ and $z_{23}$ (e.g., differential). For instance, in an embodiment, a semantic mesh gives a holistic view of the whole API call space as well as the interplay of utterances and API calls, which provides the possibility to optimize the crowdsourcing process by selectively annotating API calls. In an embodiment, a differential propagation algorithm, e.g., a probabilistic mode, may be used.

Optimization may be associated with an objective. For example, one may optimize for an NL2API algorithm, with the objective of improving the performance of the specific algorithm. Various active learning techniques may potentially be leveraged for the performance case. In an embodiment, an objective that is solely based on the semantic mesh and independent of the choice of NL2API algorithm may be used for cost savings.

In an example, it may be desirable to distinguish between and among different API calls. In semantic mesh, this means that the distribution $\theta z$ of different nodes are divergent enough. Each $\theta^z$ may be represented as an n-dimensional vector, $(p_b(w_1|z), p_b(w_2|z), \ldots, p_b(w_n|z))$, where $n=|V|$ is the vocabulary size. Under a certain vector distance metric d, the distance of two nodes is that of their distributions, e.g., $d(z_i, z_j) = d(\theta^{zi}; \theta^{zj})$. A straightforward objective is then to maximize the sum of the distance between all pairs of nodes. However, optimizing over all pair-wise distances may be computationally prohibitive, and also unnecessary. If the distance of a node pair is large, it means the corresponding nodes can already be easily distinguished, so it may be less beneficial to further increase their distance. Instead, as a heuristic, the focus may be on the node pairs that are causing the most confusion, i.e., the ones with the smallest distance.

Figure 11:
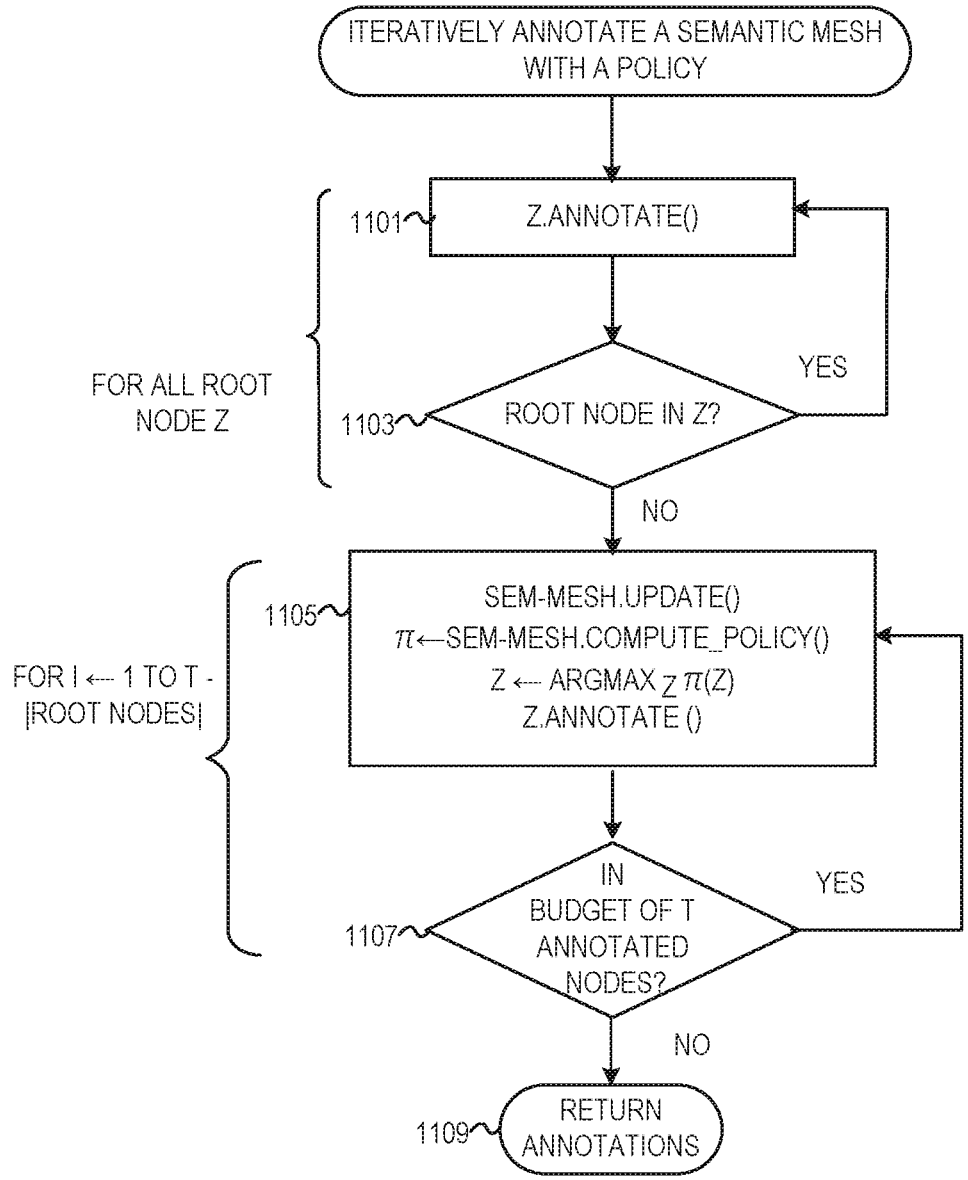
FIG. 11 is a flow diagram illustrating a method for iteratively annotating a semantic mesh with a policy, according to an embodiment.

More formally, given a semantic mesh, in an example, the node set is $\bar{Z} \subset Z$ to annotate, such that the following objective is maximized:

$\Theta = \sum_{i=1}^{K} d(z_i, z_i')$, where $(z_1, z_1'), \ldots, (z_K, z_K')$ are the first K node pairs if all node pairs are ranked by distance in ascending order. FIG. 11 is a flow diagram illustrating a method for iteratively annotating semantic mesh with a policy, according to an embodiment. As used herein, the term policy is an industry term for a function that maps some state (e.g., parameters) to some action/score (e.g., a real number). The term compute policy is meant to make explicit that this policy may be evaluated in a computer algorithm. With regards to the semantic mesh as described herein, a compute policy may take an unannotated node and "compute" a score (real number) for that node. The score may be used later in determining what canonical phrase should be labeled next. For the illustrated method, it is assumed that budget for annotation is the number of nodes T. In an example, there is a policy $\pi(z|\bar{Z}): Z\backslash\bar{Z}\mathbb{R}$ that assigns a score to each unannotated node. All root nodes may be annotated in block 1101, e.g., function call Z. ANNOTATE( ), so that the distribution for all the nodes in Z may be estimated. In an example, the Z-ANNOTATE( ) function call may assign the new label to an utterance after interpolation. This is repeated for all root nodes. When complete, as determined in block 1103, node distributions in the semantic mesh may be updated iteratively (SEM-MESH.ANNOTATE( )), in block 1105. A policy may be computed (SEM-MESH.COMPUTE_POLICY) based on the current state of the semantic mesh, which may be characterized by the set of annotated nodes $\bar{Z}$. The unannotated node with the highest score may be greedily selected ($\operatorname{argmax}_z \pi(z)$), and finally annotate the node and result in a new state (Z.ANNOTATE). The state $\bar{Z}$ may be omitted when there is no ambiguity. In practice, one may also choose to annotate multiple nodes in each iteration for efficiency consideration. Once the budget of T nodes have been annotated, as determined in block 1107, the annotations are returned in block 1109.

Figure 12:
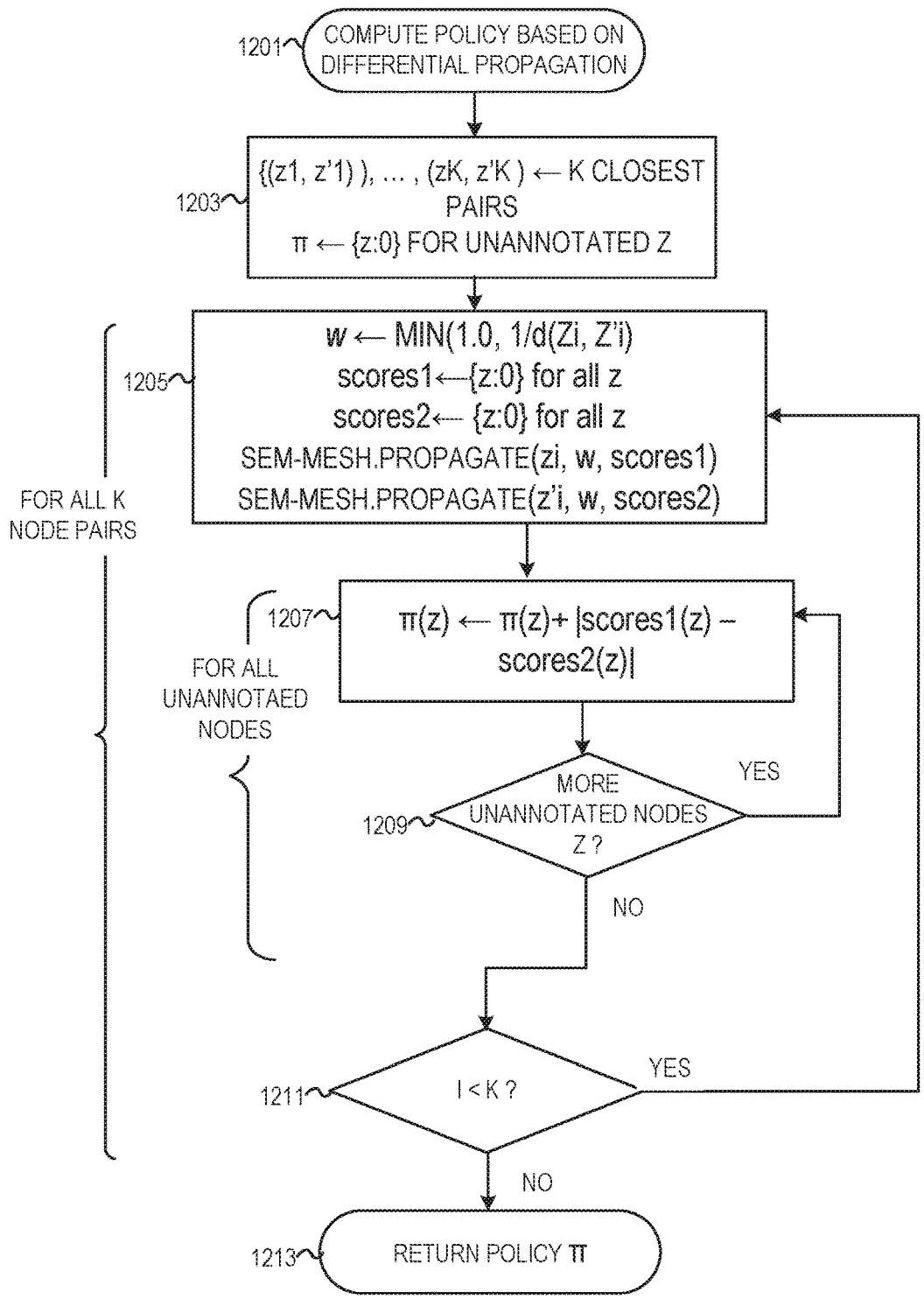
FIG. 12 is a flow diagram illustrating a method for a compute policy based on differential propagation, according to an embodiment.

A differential propagation strategy may be used for computing the policy i. For a node pair whose distance is small, all their parent nodes are examined. If the parent is shared by the node pair, the node may receive a low score because annotating the parent node will change both of the nodes in the pair, similarly. Otherwise, the parent node may receive a high score, and the closer the node pair is, the higher the score should be for the parent. An example is shown in FIG. 10. FIG. 12 is a flow diagram illustrating a method for compute policy based on differential propagation, according to an embodiment. In an embodiment, a process to compute policy based on differential propagation begins at block 1201. The pair-wise distance of all nodes may be computed at block 1203, to identify closest pairs and select policy for unannotated z. For all K node pairs identified in block 1203, the reciprocal of node distance is calculated, capped by a constant, as the score, in block 1205, so that node pairs that are closer will make a larger impact. For a pair of nodes, the score may be propagated in parallel from each node to all its parent nodes. The score of an unannotated node $\pi(z)$ may be calculated for all unannotated nodes in block 1207 as the absolute difference of its scores from a node pair, accumulated across all the node pairs. If there are mode unannotated node, as determined in block 1209, then the score of the next unannotated node may be calculated in block 1209. When there are more node pairs to score, as determined in block 1211, processing may continue at block 1205. Once processing of the nodes is complete, the policy $\pi$ may be returned in block 1213.

Figure 13:
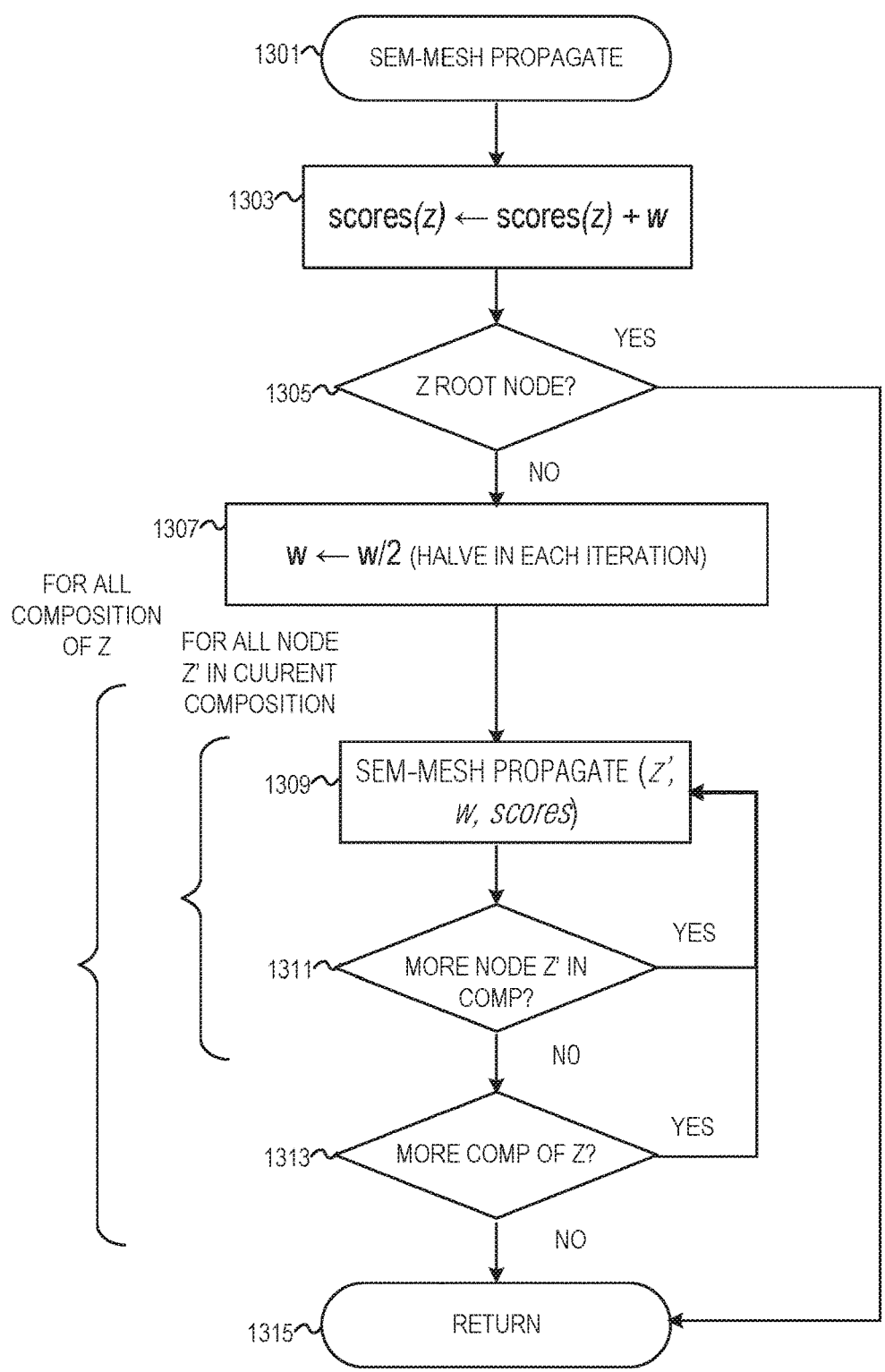
FIG. 13 is a flow diagram illustrating a method for recursively propagating a score from a source node to all of its parent nodes, according to an embodiment.

FIG. 13 is a flow diagram illustrating a method for recursively propagating a score from a source node to all of its parent nodes, (e.g., FIG. 12, block 1205), according to an embodiment. In an embodiment, a SEM-MESH.PROPAGATE function SEM-MESH 1301 takes arguments source node z, initial score w, and current score dictionary scores. The scores argument may be passed by reference. The scores for source node z may be incremented by initial score w in block 1303. If z is a root node, as determined in block 1305, then the function may return at 1315. For non-root nodes, the score w may be halved at block 1307. For each pair of nodes in a current composition, the function may be called recursively at block 1309 with the node z', current score w, and the dictionary of scores, for update. The propagate function may be called for each node in the composition until it is determined that no more nodes exist for the composition at block 1311. Scores may be propagate for all compositions of the parent node z until no more compositions exist in the semantic mesh, as determined by block 1313. When no mode compositions exist, the function may return at block 1315. Thus, the scores from each node to all of its parent nodes may be propagated in parallel.

Figure 14:
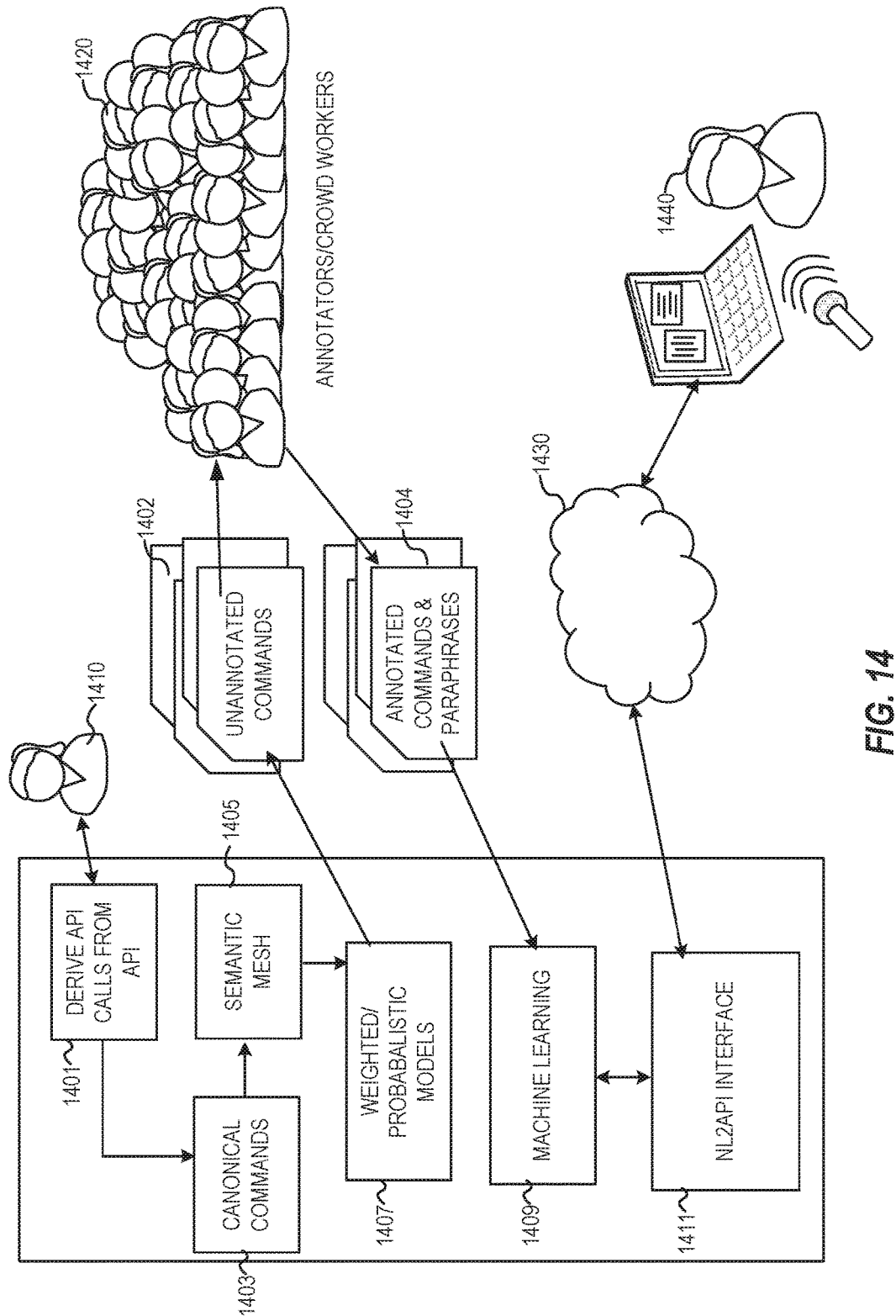
FIG. 14 is a diagram illustrating a system for generating a natural language to API (NL2API) interface for Web users, according to an embodiment.

FIG. 14 is a diagram illustrating a system for generating a natural language to API (NL2API) interface for Web users, according to an embodiment. In an embodiment, an expert 1410 may initiate programmatic identification of an API schema into API calls at 1401. The expert 1410 may assist in converting the API calls into canonical commands 1403. In an embodiment, methods as described above may be used to generate a semantic mesh of canonical commands and compositions of canonical commands 1405. A probabilistic model may be used to weight the nodes in the semantic mesh 1407, using differential propagation, to identify which canonical phrases or compositions should be annotated.

Once a set of canonical phrases has been identified for annotation 1402, the set 1402 may be sent to crowd workers, or annotators 1420, for annotation. Once annotated, the annotated command set 1404 may be send to a machine learning engine, or process 1409, to map the natural language (NL) phrases, e.g., annotated commands 1404, into the API calls to generate a natural language to API (NL2API) interface 1411. In an embodiment, a Web user 1440 may access a Web API application on a network 1430, using natural language through voice or text as an interface for the Web application.

Figure 15:
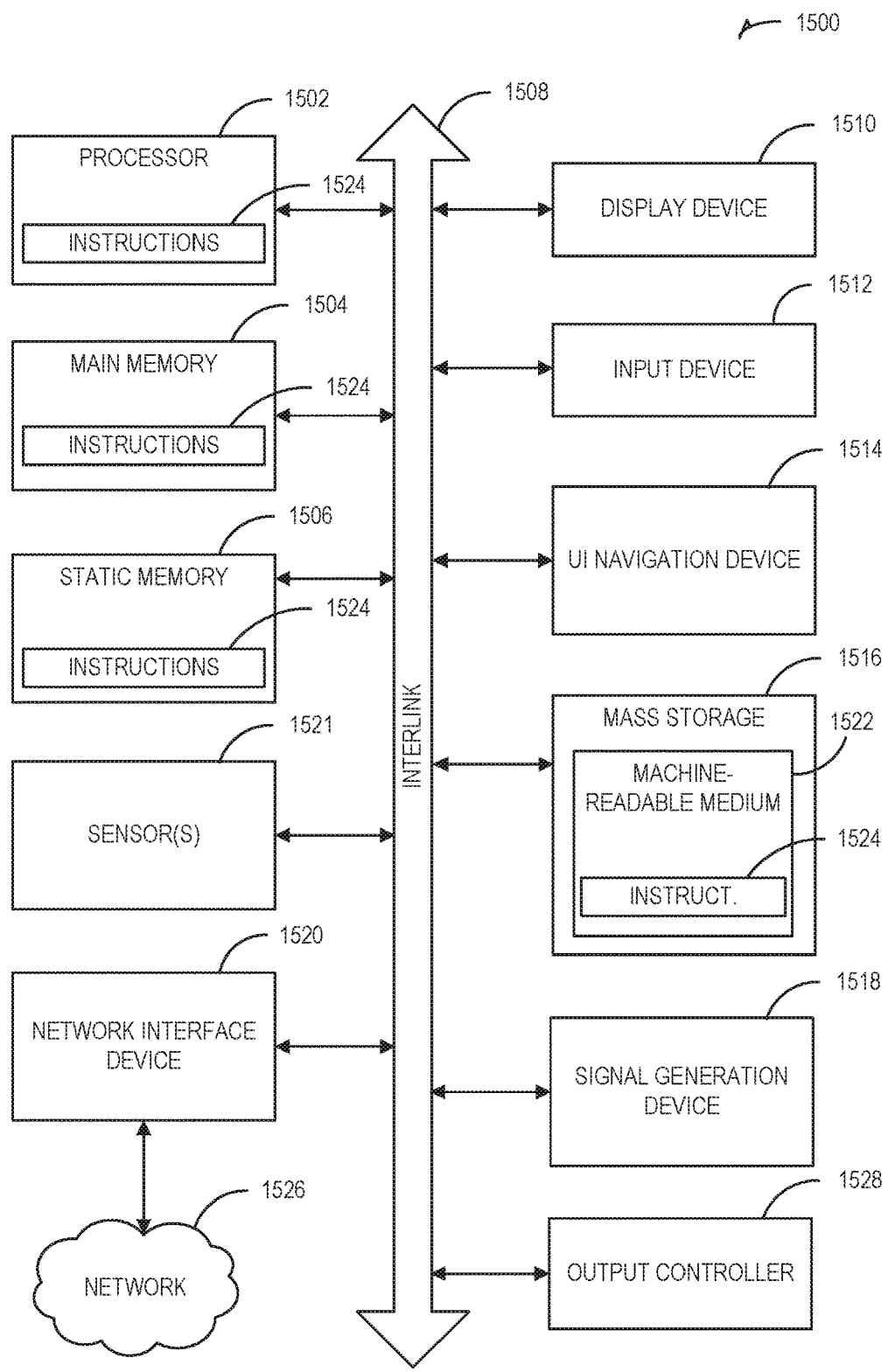
FIG. 15 is a block diagram illustrating an example of a machine upon which one or more embodiments may be implemented.

FIG. 15 illustrates a block diagram of an example machine 1500) upon which any one or more of the techniques (e.g., methodologies) discussed herein may perform. In alternative embodiments, the machine 1500 may operate as a standalone device or may be connected (e.g., networked) to other machines. In a networked deployment, the machine 1500 may operate in the capacity of a server machine, a client machine, or both in server-client network environments. In an example, the machine 1500 may act as a peer machine in peer-to-peer (P2P) (or other distributed) network environment. The machine 1500 may be a personal computer (PC), a tablet PC, a set-top box (STB), a personal digital assistant (PDA), a mobile telephone, a Web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuitry is a collection of circuits implemented in tangible entities that include hardware (e.g., simple circuits, gates, logic, etc.). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, the computer readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

Machine (e.g., computer system) 1500 may include a hardware processor 1502 (e.g., a central processing unit (CPU), a graphics processing unit (GPU), a hardware processor core, or any combination thereof), a main memory 1504 and a static memory 1506, some or all of which may communicate with each other via an interlink (e.g., bus)

1508. The machine 1500 may further include a display unit 1510, an alphanumeric input device 1512 (e.g., a keyboard), and a user interface (UI) navigation device 1514 (e.g., a mouse). In an example, the display unit 1510, input device 1512 and UI navigation device 1514 may be a touch screen display. The machine 1500 may additionally include a storage device (e.g., drive unit) 1516, a signal generation device 1518 (e.g., a speaker), a network interface device 1520, and one or more sensors 1521, such as a global positioning system (GPS) sensor, compass, accelerometer, or other sensor. The machine 1500 may include an output controller 1528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 1516 may include a machine readable medium 1522 on which is stored one or more sets of data structures or instructions 1524 (e.g., software) embodying or utilized by any one or more of the techniques or functions described herein. The instructions 1524 may also reside, completely or at least partially, within the main memory 1504, within static memory 1506, or within the hardware processor 1502 during execution thereof by the machine 1500. In an example, one or any combination of the hardware processor 1502, the main memory 1504, the static memory 1506, or the storage device 1516 may constitute machine readable media.

While the machine readable medium 1522 is illustrated as a single medium, the term "machine readable medium" may include a single medium or multiple media (e.g., a centralized or distributed database, and/or associated caches and servers) configured to store the one or more instructions 1524.

The term "machine readable medium" may include any medium that is capable of storing, encoding, or carrying instructions for execution by the machine 1500 and that cause the machine 1500 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1524 may further be transmitted or received over a communications network 1526 using a transmission medium via the network interface device 1520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 1520 may include one or more physical jacks (e.g., Ethernet, coaxial, or phone jacks) or one or more antennas to connect to the communications network 1526. In an example, the network interface device 1520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1500, and includes digital or analog communications signals or other intangible medium to facilitate communication of such software.

ADDITIONAL NOTES AND EXAMPLES

Examples may include subject matter such as a method, means for performing acts of the method, at least one machine-readable medium including instructions that, when performed by a machine cause the machine to perform acts of the method, or of an apparatus or system for generating a natural language interface to Web API system, using a hierarchical probabilistic model to select commands for annotation, according to embodiments and examples described herein.

Example 1 is a system comprising: one or more hardware processors; transmission device for providing canonical representation information to at least one annotator; and at least one machine-readable storage medium having instructions stored thereon, the instructions when executed by the one or more hardware processors, cause the one or more hardware processors to: identify the syntax and context of application program interface (API) commands using a schema for the API; generate canonical commands for the API commands using a generalized grammar; generate a semantic mesh from the canonical commands; use a hierarchical probabilistic model with the semantic mesh to identify a subset of the canonical commands for annotation; and provide the subset of the canonical representations to at least one annotator.

In Example 2, the subject matter of Example 1 optionally includes wherein the semantic mesh comprises a hierarchical structure of nodes representing a compositional relationship of the canonical commands.

In Example 3, the subject matter of any one or more of Examples 1-2 optionally include wherein instructions to generate the canonical commands further comprise instructions to: apply the generalized grammar to API commands identified from the API schema to identify a top level canonical command; and decompose the top level canonical command into components.

In Example 4, the subject matter of any one or more of Examples 1-3 optionally include a receiver configured to receive annotated paraphrases from the at least one annotator, wherein the at least one machine-readable storage medium further includes instructions to: generate a model for a natural language interface (NLI) using the received annotated paraphrases; map the annotated paraphrases to API commands associated with the API; and provide the mapping to a natural language to API command interface for a Web application.

Example 5 is a computer implemented method comprising: identifying a syntax and context of application program interface (API) commands using a schema for the API; generating canonical commands for the API commands using a generalized grammar; generating a semantic mesh from the canonical commands, wherein the semantic mesh comprises a hierarchical structure of nodes representing a compositional relationship of the canonical commands: using a hierarchical probabilistic model with the semantic mesh to identify a subset of the canonical commands for annotation: and providing the subset of the canonical representations to at least one annotator.

In Example 6, the subject matter of Example 5 optionally includes wherein generating the canonical commands comprises: applying the generalized grammar to API commands identified from the API schema to identify a top level canonical command; and decomposing the top level canonical command into components.

In Example 7, the subject matter of any one or more of Examples 5-6 optionally include wherein using the hierarchical probabilistic model with the semantic mesh comprises: computing a score based on distance between two nodes; and iteratively propagating the score from a bottom node to a top node in the semantic mesh, halving the score at each iteration, wherein the score of a node is the absolute difference of scores from two adjacent subordinate nodes.

In Example 8, the subject matter of any one or more of Examples 5-7 optionally include receiving annotated paraphrases from the at least one annotator: generating a model for a natural language interface (NLI) using the annotated paraphrases; mapping the annotated paraphrases to API commands associated with the API; and providing the mapping to a natural language to API command interface for a Web application.

In Example 9, the subject matter of any one or more of Examples 5-8 optionally include wherein using a probabilistic model comprises: computing a policy based on differential propagation for nodes in the semantic mesh, where a node represents a canonical command or a composition element of a canonical command; and recursively propagating a score from a source node to parent node of the sematic mesh.

In Example 10, the subject matter of any one or more of Examples 5-9 optionally include wherein the grammar comprises lexicons, Boolean operators, query operators, and glue operators, for use with API commands for the API, wherein the Boolean, query and glue operators are derived programmatically from the API schema, and wherein the grammar specifies rules for deriving a canonical command from an API command.

In Example 11, the subject matter of Example 10 optionally includes identifying the lexicons of the grammar based on a context associated with the API, wherein each lexicon entry is a lexical item comprising a lexical form and a syntactic category.

Example 12 is a machine readable medium having instructions stored thereon, the instructions when executed on a machine cause the machine to: identify the syntax and context of application program interface (API) commands using a schema for the API; generate canonical commands for the API commands using a generalized grammar; generate a semantic mesh from the canonical commands; identify a subset of the canonical commands for annotation using a hierarchical probabilistic model with the semantic mesh; and provide the subset of the canonical representations to at least one annotator.

In Example 13, the subject matter of Example 12 optionally includes wherein the semantic mesh comprises a hierarchical structure of nodes representing a compositional relationship of the canonical commands.

In Example 14, the subject matter of any one or more of Examples 12-13 optionally include wherein instructions to generate the canonical commands comprises instructions to: apply the generalized grammar to API commands identified from the API schema to identify a top level canonical command: and decompose the top level canonical command into components.

In Example 15, the subject matter of Example 14 optionally includes wherein a top level canonical command is a parent node for at least two component nodes in the semantic mesh, and wherein a component node without associated additional components is a root node.

In Example 16, the subject matter of any one or more of Examples 12-15 optionally include wherein identifying a subset of the canonical commands for annotation comprises instructions to: compute a score based on distance between two nodes; and iteratively propagate the score from a bottom node to a top node in the semantic mesh, halving the score at each iteration, wherein the score of a node is the absolute difference of scores from two adjacent subordinate nodes.

In Example 17, the subject matter of any one or more of Examples 12-16 optionally include instructions to: receive annotated paraphrases from the at least one annotator; generate a model for a natural language interface (NLI) using the annotated paraphrases; map the annotated paraphrases to API commands associated with the API: and provide the mapping to a natural language to API command interface for a Web application.

In Example 18, the subject matter of any one or more of Examples 12-17 optionally include wherein using the hierarchical probabilistic model comprises instructions to: compute a policy based on differential propagation for nodes in the semantic mesh, where a node represents a canonical command or a composition element of a canonical command; and recursively propagate a score from a source node to parent node of the sematic mesh.

In Example 19, the subject matter of any one or more of Examples 12-18 optionally include wherein the grammar comprises lexicons, Boolean operators, query operators, and glue operators, for use with API commands for the API, wherein the Boolean, query and glue operators are derived programmatically from the API schema, and wherein the grammar specifies rules for deriving a canonical command from an API command.

In Example 20, the subject matter of Example 19 optionally includes wherein the lexicons of the grammar are based on a context associated with the API, wherein each lexicon entry is a lexical item comprising a lexical form and a syntactic category.

Example 21 is a system configured to perform operations of any one or more of Examples 1-20.

Example 22 is a method for performing operations of any one or more of Examples 1-20.

Example 23 is a machine readable medium including instructions that, when executed by a machine cause the machine to perform the operations of any one or more of Examples 1-20.

Example 24 is a system comprising means for performing the operations of any one or more of Examples 1-20.

The techniques described herein are not limited to any particular hardware or software configuration; they may find applicability in any computing, consumer electronics, or processing environment. The techniques may be implemented in hardware, software, firmware or a combination, resulting in logic or circuitry which supports execution or performance of embodiments described herein.

For simulations, program code may represent hardware using a hardware description language or another functional description language which essentially provides a model of how designed hardware is expected to perform. Program code may be assembly or machine language, or data that may be compiled and/or interpreted. Furthermore, it is common in the art to speak of software, in one form or another as taking an action or causing a result. Such expressions are merely a shorthand way of stating execution of program code by a processing system which causes a processor to perform an action or produce a result.

Each program may be implemented in a high level procedural, declarative, and/or object-oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the operations described herein. Alternatively, the operations may be performed by specific hardware components that contain hardwired logic for performing the operations, or by any combination of programmed computer components and custom hardware components. The methods described herein may be provided as a computer program product, also described as a computer or machine accessible or readable medium that may include one or more machine accessible storage media having stored thereon instructions that may be used to program a processing system or other electronic device to perform the methods.

Program code, or instructions, may be stored in, for example, volatile and/or non-volatile memory, such as storage devices and/or an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine readable medium may include any mechanism for storing, transmitting, or receiving information in a form readable by a machine, and the medium may include a tangible, or non-transitory medium through which electrical, optical, acoustical or other form of propagated signals or carrier wave encoding the program code may pass, such as antennas, optical fibers, communications interfaces, etc. Program code may be transmitted in the form of packets, serial data, parallel data, propagated signals, etc., and may be used in a compressed or encrypted format.

Program code may be implemented in programs executing on programmable machines such as mobile or stationary computers, personal digital assistants, smart phones, mobile Internet devices, set top boxes, cellular telephones and pagers, consumer electronics devices (including DVD players, personal video recorders, personal video players, satellite receivers, stereo receivers, cable TV receivers), and other electronic devices, each including a processor, volatile and/or non-volatile memory readable by the processor, at least one input device and/or one or more output devices. Program code may be applied to the data entered using the input device to perform the described embodiments and to generate output information. The output information may be applied to one or more output devices. One of ordinary skill in the art may appreciate that embodiments of the disclosed subject matter can be practiced with various computer system configurations, including multiprocessor or multiple-core processor systems, minicomputers, mainframe computers, as well as pervasive or miniature computers or processors that may be embedded into virtually any device. Embodiments of the disclosed subject matter can also be practiced in distributed computing environments, cloud environments, peer-to-peer or networked microservices, where tasks or portions thereof may be performed by remote processing devices that are linked through a communications network.

A processor subsystem may be used to execute the instruction on the machine-readable or machine accessible media. The processor subsystem may include one or more processors, each with one or more cores. Additionally, the processor subsystem may be disposed on one or more physical devices. The processor subsystem may include one or more specialized processors, such as a graphics processing unit (GPU), a digital signal processor (DSP), a field programmable gate array (FPGA), or a fixed function processor.

Although operations may be described as a sequential process, some of the operations may in fact be performed in parallel, concurrently, and/or in a distributed environment, and with program code stored locally and/or remotely for access by single or multi-processor machines. In addition, in some embodiments the order of operations may be rearranged without departing from the spirit of the disclosed subject matter. Program code may be used by or in conjunction with embedded controllers.

Examples, as described herein, may include, or may operate on, circuitry, logic or a number of components, modules, or mechanisms. Modules may be hardware, software, or firmware communicatively coupled to one or more processors in order to carry out the operations described herein. It will be understood that the modules or logic may be implemented in a hardware component or device, software or firmware running on one or more processors, or a combination. The modules may be distinct and independent components integrated by sharing or passing data, or the modules may be subcomponents of a single module, or be split among several modules. The components may be processes running on, or implemented on, a single compute node or distributed among a plurality of compute nodes running in parallel, concurrently, sequentially or a combination, as described more fully in conjunction with the flow diagrams in the figures. As such, modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured, arranged or adapted by using software: the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

While this subject matter has been described with reference to illustrative embodiments, this description is not intended to be construed in a limiting or restrictive sense. For example, the above-described examples (or one or more aspects thereof) may be used in combination with others. Other embodiments may be used, such as will be understood by one of ordinary skill in the art upon reviewing the disclosure herein. The Abstract is to allow the reader to quickly discover the nature of the technical disclosure. However, the Abstract is submitted with the understanding that it will not be used to interpret or limit the scope or meaning of the claims.

What is claimed is:

1. A system comprising:
one or more hardware processors;
transmission device for providing canonical representation information to at least one annotator; and
at least one machine-readable storage medium having instructions stored thereon, the instructions when executed by the one or more hardware processors, cause the one or more hardware processors to:
identify the syntax and context of application program interface (API) commands using a schema for the API;
generate canonical commands for the API commands using a generalized grammar;
generate a semantic mesh from the canonical commands;
use a hierarchical probabilistic model with the semantic mesh to identify a subset of the canonical commands for annotation; and
provide the subset of the canonical commands to the at least one annotator.

2. The system as recited in claim 1, wherein the semantic mesh comprises a hierarchical structure of nodes representing a compositional relationship of the canonical commands.

3. The system as recited in claim 1, wherein instructions to generate the canonical commands further comprise instructions to:
apply the generalized grammar to API commands identified from the API schema to identify a top level canonical command; and
decompose the top level canonical command into components.

4. The system as recited in claim 1, further comprising:
a receiver configured to receive annotated paraphrases from the at least one annotator, wherein the at least one machine-readable storage medium further includes instructions to:
generate a model for a natural language interface (NLI) using the received annotated paraphrases;
map the annotated paraphrases to API commands associated with the API; and
provide the mapping to a natural language to API command interface for a Web application.

5. A computer implemented method comprising:
identifying a syntax and context of application program interface (API) commands using a schema for the API;
generating canonical commands for the API commands using a generalized grammar;
generating a semantic mesh from the canonical commands, wherein the semantic mesh comprises a hierarchical structure of nodes representing a compositional relationship of the canonical commands;
using a hierarchical probabilistic model with the semantic mesh to identify a subset of the canonical commands for annotation; and
providing the subset of the canonical commands to at least one annotator.

6. The computer implemented method as recited in claim 5, wherein generating the canonical commands comprises:
applying the generalized grammar to API commands identified from the API schema to identify a top level canonical command; and
decomposing the top level canonical command into components.

7. The computer implemented method as recited in claim 5, wherein using the hierarchical probabilistic model with the semantic mesh comprises:
computing a score based on distance between two nodes; and
iteratively propagating the score from a bottom node to a top node in the semantic mesh, halving the score at each iteration, wherein the score of a node is the absolute difference of scores from two adjacent subordinate nodes.

8. The computer implemented method as recited in claim 5, further comprising:
receiving annotated paraphrases from the at least one annotator;
generating a model for a natural language interface (NLI) using the annotated paraphrases;
mapping the annotated paraphrases to API commands associated with the API; and
providing the mapping to a natural language to API command interface for a Web application.

9. The computer implemented method as recited in claim 5, wherein using a probabilistic model comprises:
computing a policy based on differential propagation for nodes in the semantic mesh, where a node represents a canonical command or a composition element of a canonical command; and
recursively propagating a score from a source node to parent node of the semantic mesh.

10. The computer implemented method as recited in claim 5, wherein the grammar comprises lexicons, Boolean operators, query operators, and glue operators, for use with API commands for the API, wherein the Boolean, query and glue operators are derived programmatically from the API schema, and wherein the grammar specifies rules for deriving a canonical command from an API command.

11. The computer implemented method as recited in claim 10, further comprising identifying the lexicons of the grammar based on a context associated with the API, wherein each lexicon entry is a lexical item comprising a lexical form and a syntactic category.

12. A machine readable medium having instructions stored thereon; the instructions when executed on a machine cause the machine to:
   identify the syntax and context of application program interface (API) commands using a schema for the API;
   generate canonical commands for the API commands using a generalized grammar;
   generate a semantic mesh from the canonical commands;
   identify a subset of the canonical commands for annotation using a hierarchical probabilistic model with the semantic mesh; and
   provide the subset of the canonical commands to at least one annotator.

13. The machine readable medium as recited in claim 12, wherein the semantic mesh comprises a hierarchical structure of nodes representing a compositional relationship of the canonical commands.

14. The machine readable medium as recited in claim 12, wherein instructions to generate the canonical commands comprises instructions to:
   apply the generalized grammar to API commands identified from the API schema to identify a top level canonical command; and
   decompose the top level canonical command into components.

15. The machine readable medium as recited in claim 14, wherein a top level canonical command is a parent node for at least two component nodes in the semantic mesh, and wherein a component node without associated additional components is a root node.

16. The machine readable medium as recited in claim 12, wherein identifying a subset of the canonical commands for annotation comprises instructions to:
   compute a score based on distance between two nodes; and
   iteratively propagate the score from a bottom node to a top node in the semantic mesh, halving the score at each iteration, wherein the score of a node is the absolute difference of scores from two adjacent subordinate nodes.

17. The machine readable medium as recited in claim 12, further comprising instructions to:
   receive annotated paraphrases from the at least one annotator;
   generate a model for a natural language interface (NLI) using the annotated paraphrases;
   map the annotated paraphrases to API commands associated with the API; and
   provide the mapping to a natural language to API command interface for a Web application.

18. The machine readable medium as recited in claim 12, wherein using the hierarchical probabilistic model comprises instructions to:
   compute a policy based on differential propagation for nodes in the semantic mesh, where a node represents a canonical command or a composition element of a canonical command; and
   recursively propagate a score from a source node to parent node of the semantic mesh.

19. The machine readable medium as recited in claim 12, wherein the grammar comprises lexicons, Boolean operators, query operators, and glue operators, for use with API commands for the API, wherein the Boolean, query and glue operators are derived programmatically from the API schema, and wherein the grammar specifies rules for deriving a canonical command from an API command.

20. The machine readable medium as recited in claim 19, wherein the lexicons of the grammar are based on a context associated with the API, wherein each lexicon entry is a lexical item comprising a lexical form and a syntactic category.

* * * * *